United States Patent
Lane et al.

(10) Patent No.: US 9,902,861 B2
(45) Date of Patent: Feb. 27, 2018

(54) SINGLE COLOR REVERSIBLE TEMPERATURE INDICATOR

(71) Applicant: KLT Technologies, Dayton, OH (US)

(72) Inventors: Randall Lane, Lebanon, OH (US); Steve Yeager, Miami Township, OH (US); Victor Uttinger, Middletown, OH (US)

(73) Assignee: KLT Technologies, Dayton, OH (US)

( * ) Notice: Subject to any disclaimer, the term of this patent is extended or adjusted under 35 U.S.C. 154(b) by 218 days.

(21) Appl. No.: 14/746,063

(22) Filed: Jun. 22, 2015

(65) Prior Publication Data

US 2015/0368487 A1   Dec. 24, 2015

Related U.S. Application Data

(60) Provisional application No. 62/015,404, filed on Jun. 21, 2014.

(51) Int. Cl.
*G01K 11/16* (2006.01)
*C09D 5/14* (2006.01)
*G01K 11/18* (2006.01)
*C09D 11/10* (2014.01)
*C09D 11/50* (2014.01)

(52) U.S. Cl.
CPC ............ *C09D 5/14* (2013.01); *C09D 11/10* (2013.01); *C09D 11/50* (2013.01); *G01K 11/16* (2013.01); *G01K 11/18* (2013.01)

(58) Field of Classification Search
CPC .......... G01K 3/04; G01K 11/10; G01K 11/12; G01K 11/125; G01K 11/14; G01K 11/16; G01K 11/165; G01K 11/18; C09D 11/10; C09D 11/18

USPC ........ 116/207, 216, 217, 218, 219; 252/962; 374/104, 161, 162
See application file for complete search history.

(56) References Cited

U.S. PATENT DOCUMENTS

| | | | |
|---|---|---|---|
| 2,800,457 A | 7/1957 | Green et al. |
| 2,800,458 A | 7/1957 | Green |
| 3,619,254 A | 11/1971 | Davis |
| 3,969,264 A | 7/1976 | Davis |

(Continued)

FOREIGN PATENT DOCUMENTS

| JP | 01-112123 | 4/1989 |
|---|---|---|
| JP | 10-197363 | 7/1998 |

(Continued)

OTHER PUBLICATIONS

Website featuring "Cook'd Right™ Sensor" by Volk Enterprises, Inc., http://www.volkenterprises.com/products/temperature-indicators/cookd-right-sensor/ (at least as of Apr. 10, 2014).

*Primary Examiner* — R. A. Smith
(74) *Attorney, Agent, or Firm* — FisherBroyles, LLP; Susan M. Oiler

(57) ABSTRACT

A printable ink for reversible thermal indicators that includes microcapsules retaining therein a core material that is opaque as a solid and transparent as a liquid, and a binder and a rheology modifier as a carrier for the microcapsules. The binder and the rheology modifier are either the same substance or different substances. The microcapsules in the printable ink retain the core material therein for repeated, reversible transitions from solid to liquid and liquid to solid.

19 Claims, 2 Drawing Sheets

(56) References Cited

U.S. PATENT DOCUMENTS

| | | | |
|---|---|---|---|
| 4,022,706 A | 5/1977 | Davis | |
| 4,150,572 A * | 4/1979 | Lindquist | G01K 11/06 116/207 |
| 4,248,089 A * | 2/1981 | Heinmets | G01K 11/06 374/162 |
| 4,717,710 A | 1/1988 | Shimizu et al. | |
| 4,851,282 A | 7/1989 | Shimizu et al. | |
| 4,952,033 A | 8/1990 | Davis | |
| 4,957,949 A | 9/1990 | Kamada et al. | |
| 5,058,999 A | 10/1991 | Davis | |
| 5,124,819 A | 6/1992 | Davis | |
| 5,685,641 A | 11/1997 | Ribi | |
| 5,997,849 A | 12/1999 | Small et al. | |
| 6,008,269 A | 12/1999 | Kitagawa et al. | |
| 6,042,264 A * | 3/2000 | Prusik et al. | G01K 3/04 116/219 |
| 6,139,779 A | 10/2000 | Small et al. | |
| 6,564,742 B2 | 5/2003 | Perner et al. | |
| 6,604,854 B1 * | 8/2003 | Limburg et al. | G01K 11/165 116/207 |
| 6,863,720 B2 | 3/2005 | Kitagawa et al. | |
| 7,294,379 B2 | 11/2007 | Ko et al. | |
| 7,332,109 B2 | 2/2008 | Senga et al. | |
| 7,514,262 B2 * | 4/2009 | Ribi | G01N 31/229 116/206 |
| 8,066,432 B2 | 11/2011 | Yang et al. | |
| 8,448,809 B2 | 5/2013 | Kelly | |
| 8,569,208 B1 | 10/2013 | Ribi | |
| 2004/0140451 A1 * | 7/2004 | Meyer et al. | B41M 5/5227 252/299.01 |
| 2004/0229754 A1 * | 11/2004 | Fujita | B41M 5/305 503/209 |
| 2007/0218206 A1 * | 9/2007 | Reichert et al. | B41M 7/00 427/256 |
| 2010/0247900 A1 | 9/2010 | Parker et al. | |
| 2014/0044609 A1 * | 2/2014 | Prusik et al. | G01K 11/12 422/429 |
| 2016/0349225 A1 * | 12/2016 | Prusik et al. | G01K 11/12 |

FOREIGN PATENT DOCUMENTS

| | | | |
|---|---|---|---|
| JP | 2006-133190 | 5/2006 | |
| SU | 401214 A * | 10/1976 | G01K 11/16 |

\* cited by examiner

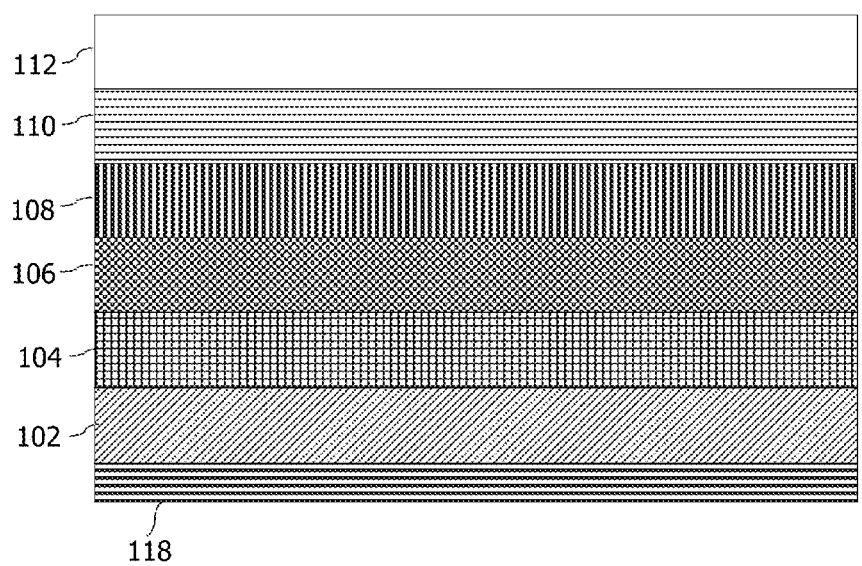

SINGLE COLOR REVERSIBLE TEMPERATURE INDICATOR

FIELD OF THE INVENTION

The present invention relates generally to a reversible temperature indicator and more particularly to a reversible temperature indicator that changes from opaque to transparent, thus changing from visible to invisible. It can also change to reveal either an image or color lying thereunder.

BACKGROUND OF THE INVENTION

Three examples of reversible temperature indicators include liquid crystal indicators, thermochromic inks, and diacetylinic polymers. One problem with these temperature indicators includes limitations on the transition temperature for the indicator, in particular for thermochromic inks and diacetylinic polymers. Thermochromic inks and diacetylinic polymers require about 5-10° C. for the color change to occur, which severely limits their accuracy for temperature indication.

Another problem with some of these known reversible temperature indicators is the color transition, in particular with the gradual change over the broad temperature range mentioned above for the thermochromic inks or to more than one color over a range. Some liquid crystals change from red to green to blue over a temperature range, which can lead to confusion when determining the exact temperature. Moreover, liquid crystals are transparent below the threshold temperature range and also above, which could lead to a false reading.

Thermochromic inks, which typically include a leuco dye, a developer, and a melt point control chemical (usually a fatty acid ester and/or alcohol), are more complex than the formulations disclosed herein. Moreover, some thermochromic inks require the leuco dye and the developer to be kept separate from one another until activation is desired. The need to keep the activator separate from a dye, for example, adds complexity to the overall structure of the temperature indicator and increased difficulty in manufacturing. Thermochromic inks are also susceptible to fading if exposed to UV light.

Another problem with these known reversible temperature indicators is the expense of the materials and limited suppliers. Diacetylinic polymers as raw materials are very expensive and are susceptible to fading and shifting of the color transition temperature if exposed to ultraviolet light, electron beam, or gamma radiation. Liquid crystals and thermochromic inks have limited suppliers and are moderately to highly expensive.

Accordingly, there is a need for a more economic reversible temperature indicator that solves these problems.

SUMMARY OF INVENTION

In one aspect, a reversible temperature indicator for products that require an accurate indication of when they have exceeded a specific temperature is disclosed.

In another aspect, a printable ink for reversible thermal indicators is disclosed that includes a microcapsule retaining therein a core material that is opaque as a solid and transparent as a liquid, and a binder and a rheology modifier as a carrier for the microcapsules. The binder and the rheology modifier are either the same substance or different substances. The microcapsules in the printable ink retain the core material therein for repeated, reversible transitions from solid to liquid and liquid to solid. In one aspect, the core material has a phase change from solid to liquid or liquid to solid within one degree Celsius.

In one embodiment, the core material is selected from the group consisting of straight chain hydrocarbons having 12-44 carbons, polyethylene waxes, microcrystalline waxes, fatty acid esters, fatty acids, and fatty acid alcohols and combinations thereof, and the core material comprises about 25% to about 48% by weight of the printable ink. In another embodiment, the core material comprises about 27% to about 37% by weight of the printable ink. In another embodiment, the core material further comprises a nucleating agent, which may include one or more of a hyperbranched hydrocarbon polymer, fatty acids, microcrystalline waxes, isoparaffins, polyethylene waxes, and combinations thereof.

In one embodiment, the binder and the rheology modifier are the same substance and include one or more of an aqueous polyvinyl alcohol solution and a carboxy methyl cellulose.

In one embodiment, the wall material is selected from the group consisting of gelatin, albumin, methyl cellulose, carboxy methylcellulose, and combinations thereof.

In another aspect, a reversible temperature indicator is disclosed that includes a substrate having a colored surface with at least a portion of the colored surface covered with the printable ink described herein.

BRIEF DESCRIPTION OF THE DRAWINGS

FIG. 3 is an illustration representative of a transverse cross-section through a single color, reversible temperature indicator.

DETAILED DESCRIPTION OF INVENTION

Figure 1:
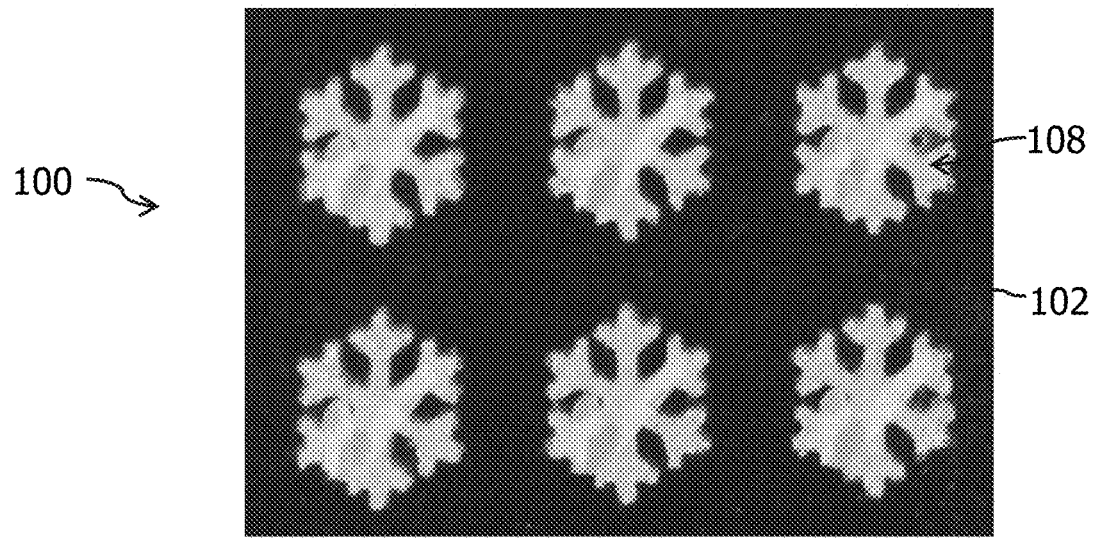
FIG. 1 is a photograph of a plurality of example single color, reversible temperature indicators in a first state corresponding to exposure to a temperature in a first predetermined temperature range.
Figure 2:
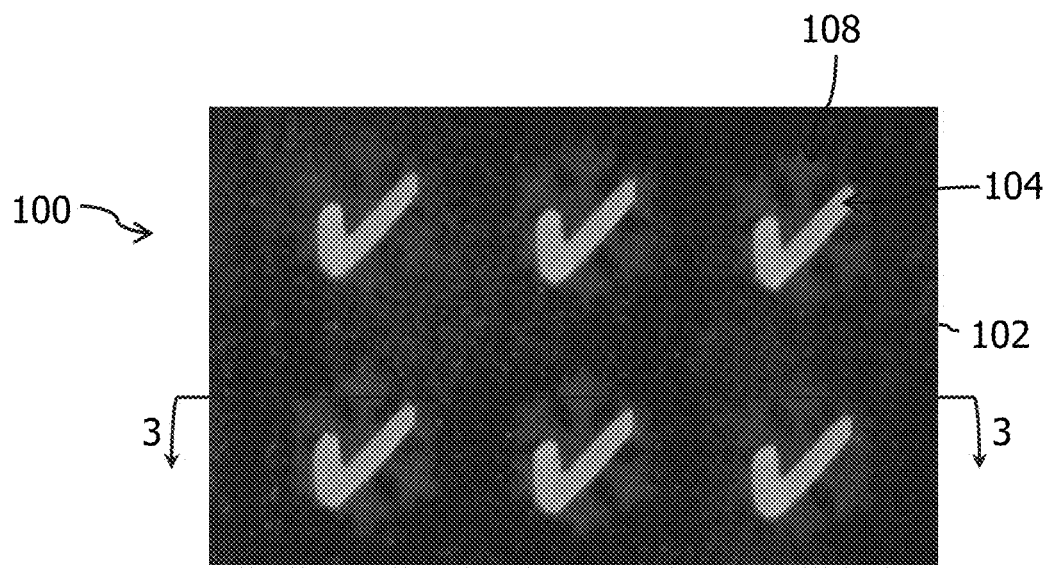
FIG. 2 is a photograph of the plurality of example single color, reversible temperature indicators of FIG. 1 in a second state after exposure to a temperature in a second predetermined temperature range that is different than the first predetermined temperature range.

Highly accurate single color, reversible temperature indicators are disclosed herein that change from opaque to transparent when heated or cooled beyond a preset temperature. Referring to FIGS. 1-3, the reversible temperature indicator 100 is useful on products that require an accurate indication of when they have exceeded (gone above or below) a specific temperature. The reversible color indicator 100 includes a substrate 102 that is itself colored or has an image, artwork, or colored surface thereon 104 that has on at least a portion thereof a temperature sensitive composition 108 that changes from white to transparent when exposed to appropriate temperature. The white phase may be altered to colored by the addition of a coloring agent or dye as long as it would not obscure the transparency of the other phase.

The temperature sensitive composition 108 may be applied as a substantially continuous layer over the substrate 102 or as an image, artwork, word, or other indicia on at least a portion of the substrate 102. In one embodiment, the temperature sensitive composition is referred to as an "ink" composition because it can be applied using printing techniques used with printers such as, but not limited to, flexography, silk screen, gravure, and inkjet.

As seen in FIGS. 1-2, the colored or imaged substrate 102 having the temperature sensitive composition 108 applied thereto may be in the form of label having, as shown in FIG. 3, an adhesive layer 118 on the side thereof that is opposite the side having the ink composition 108 applied thereto. The adhesive layer may include any known or hereinafter developed adhesive formulation such as a pressure sensitive adhesive, water-activated adhesive, etc.

FIG. 1 shows the label as having the ink composition 108 applied in the image of a snowflake, for example, which is white. Then, in FIG. 2, after being exposed to a temperature above the melting point of a material in the temperature sensitive composition 108, the white image of a snowflake changes to transparent and an underlayer having an image in the form of a checkmark is now visible. Because there is a single color change from white to clear, the label's exposure to temperatures beyond the melting point temperature is unmistakably clear, unlike with liquid crystals which change from red to green to blue.

As shown in FIG. 3, the label or reversible temperature indicator 100 may include a primer coat 106 between the ink composition 108 and the colored surface 104 of the substrate 102. The primer coat 106 is present to improve the adhesion of the ink composition 108 to the substrate 102. The primer coat 106 may be or include, but is not limited to, either polymer solutions or emulsions of acrylic, styrene acrylic, polyurethane, ethylene-acrylic acid, and combinations thereof.

Still referring to FIG. 3, the label or reversible temperature indicator 100 may include a protective layer over the ink composition or temperature sensitive composition 108. The protective layer 112 may be or include typical protective lamination tapes consisting of a film made of polyester, polypropylene, polyethylene, and other films and a pressure sensitive adhesive. The pressure sensitive adhesive 110 may be acrylic based or rubber based.

An example of use of label as an ascending reversible temperature indictor is as a label on a pharmaceutical product that requires refrigeration for storage, but needs to be warmed to a temperature above a specific threshold temperature before use by the patient. The reversible temperature indicator can be applied to the pharmaceutical product, and the product placed in refrigeration. The indicator will turn white in the refrigerator. When the product is removed from the refrigerator to warm for use, the indicator will remain white until the temperature ascends and the threshold temperature is exceeded, at which point it becomes transparent. The patient then knows the product is safe to use. The product may be returned to the refrigerator and upon cooling, the reversible temperature indicator will return to the white color. The label is therefore reset for subsequent temperature indication.

An example of a descending reversible indicator is as a label on a wine that is best served below a specific temperature. The indicator could be printed onto the wine label and when placed in the refrigerator, the indicator would turn from transparent (at least room temperature) to white upon chilling and visible when the temperature of the contents was at or below the specific temperature.

The reversible nature of the reversible temperature indicator is facilitated by the use of microcapsules to retain a core material that is opaque as a solid and is transparent as a liquid for repeated phase change transitions as environmental/surrounding temperatures increase and/or decrease. The microcapsules must be sufficiently robust to withstand repeated temperature cycles without rupture. The wall material of the microcapsules should be thick enough to contain the core material while in its liquid phase without leakage therefrom, especially over repeated temperature cycles. The capsule walls should be sufficiently thick to avoid rupture when processed into the ink or layer on the substrate as described above and when handled by a user to apply the label to a product. The wall thickness may be about 0.1 to about 0.9 microns. In one embodiment, the wall may be about 0.2 to about 0.6 microns thick with a nominal (mean) thickness of about 0.4 microns.

Any of a variety of processes known in the art may be used to form the microcapsules. Chemical techniques may be used, such as dispersing droplets of molten core material in an aqueous solution and to form walls around the droplets using simple or complex coacervation, interfacial polymerization and in situ polymerization, all of which are well known in the art. For example, methods are well known in the art to form gelatin capsules by coacervation, polyurethane or polyurea capsules by interfacial polymerization, and urea-formaldehyde, urea-resorcinol-formaldehyde, and melamine formaldehyde capsules by in situ polymerization. In one embodiment, the microcapsules are gelatin or gelatin-containing microcapsules, which may be made using well-known methods such as the phase separation processes or coacervation processes, such as those described in U.S. Pat. Nos. 2,800,457 and 2,800,458.

Coacervation is one example process that produces capsules of 2-1200 μm relative particle size. In simple coacervation, a desolvation agent is added for phase separation. In complex coacervation, complexation between two oppositely charged polymers typically is utilized. For example, the core material (usually an oil) is dispersed into a polymer solution (e.g., a cationic aqueous polymer, gelatin, etc.) and a solution containing a second polymer (e.g., an anionic, water soluble, gum arabic) solution is added thereto, which causes wall material to deposition onto the core material particles when the two polymers form a complex. The formation of the complex may be initiated by the addition of a salt, by changing the pH, changing the temperature, and/or by diluting the solution. After formation of the complex and hence the microcapsules, the microcapsules are stabilized by crosslinking, desolvation, or thermal treatment. In one embodiment, the microcapsules produced have a relative particle size of 5-50 μm.

Here, the wall material may be a gum, carbohydrate, cellulose material, lipid, or protein. Example gums include, but are not limited to, gum arabic, sodium alginate, and carrageenan. Example carbohydrates include, but are not limited to, starch, modified starch, dextran, maltodextrin, agarose, and sucrose. Example cellulose materials include, but are not limited to, carboxymethylcellulose and methylcellulose. Example lipids include, but are not limited to, bees wax, stearic acid, and phospholipids. Example proteins include, but are not limited to, gelatin, albumin, and soy protein.

Here, to form a reversible color indicator that changes from opaque as a solid to transparent as a liquid, the core material, in one embodiment, is or includes one or more straight-chain alkanes or paraffinic hydrocarbons having 12 to 44 carbons, represented by the formula $C_nH_{n+2}$. It can be appreciated from this range of carbons that it is understood that each alkane increasing in length by 1 carbon is described individually by this range. Some example paraffin hydrocarbons within this range are listed in the table below along with their respective melting point:

| Compound Name | # Carbon Atoms | Melting Point (° C.) |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

If the straight-chain alkane has a phase change from solid to liquid or liquid to solid that occurs within one degree Celsius, it may be used as the core material without being mixed with other core material. However, a nucleation agent as discussed below may be included therein. A phase change from solid to liquid or liquid to solid being "within one degree Celsius," as used herein, means that the phase change is sensitive and occurs generally to completion during a one degree (or less) temperature change; for example, the core material may experience its phase change once the temperature thereof is within a range of 19° C.-20° C. or decreases to a temperature range of 19° C.-20° C.

In one embodiment, the core material includes a plurality of the straight-chain alkanes to tailor the melting point of the core material to a selected threshold temperature appropriate for the product intended to include the reversible temperature indicators described above. For example, if the core material includes a mixture of n-Hexadecane and n-Pentadecane, the melting point of the core material can be tailored for a selected temperature between 10° C. and 18.2° C., depending upon how much of each is used in the mixture. Mixtures may be used to tailor the core material to have a phase change from solid to liquid or liquid to solid that is within one degree Celsius within the range of 10° C. and 18.2° C. Accordingly, there are a plurality of many one degree Celsius increments possible within this range that would be suitable for the core material to complete a phase change.

In another embodiment, the core material may include one or more of polyethylene waxes, microcrystalline waxes, fatty acids, fatty acid alcohols, fatty acid esters, and combinations thereof. In another embodiment, the core material may include one or more of straight-chain alkanes mixed with one or more of polyethylene waxes, microcrystalline waxes, fatty acid esters, fatty acids, fatty acid alcohols, and combinations thereof. Here again, mixtures may be used to tailor the core material to have a specific melting point and a phase change from solid to liquid or liquid to solid that occurs in a one degree or less temperature change at its melting point temperature.

The fatty acid esters may be methyl esters such as, but not limited to, methyl palmitate, methyl formate, methyl esters of fatty acids such as methyl caprylate, methyl caprate, methyl laurate, methyl myristate, methyl palmitate, methyl stearate, methyl arachidate, methyl behenate, and methyl lignocerate; fatty acids may consist of caproic acid, caprylic acid, lauric acid, myristic acid, palmitic acid, stearic acid, arachidic acid, behenic acid, lignoceric acid, and cerotic acid; and fatty acid alcohols such as capryl alcohol, lauryl alcohol, myristyl alcohol, cetyl alcohol, stearyl alcohol, arachidyl alcohol, behenyl alcohol, lignoceryl alcohol, ceryl alcohol, montanyl alcohol, myricyl alcohol, and geddyl alcohol.

Polyethylene and microcrystalline waxes are available from a variety of suppliers in a range of molecular weights and melt points. An example of commercial polyethylenes would be the A-C product line from Honeywell. An example of commercial microcrystalline waxes would be the Microsere products from IGI.

Another component of the core is the nucleation aid. The nucleation aid reduces supercooling, and causes the core to predictably freeze at the same temperature, which is necessary for making an accurate temperature descending indicator (indicates when there is a temperature excursion below a listed response temperature). It also improves the crystal structure, which improves opacity because it refracts light more efficiently. The nucleation aid may include, but are not limited to, fatty acids, such as those listed above, and/or isoparaffins, microcrystalline waxes, polyethylene waxes, and hyperbranched hydrocarbon polymers.

The microcapsules will typically have a relatively high payload of core material of about 60% to about 85% by weight of the microcapsule. In one embodiment, the core material is present at about 70% to about 80% by weight.

After the microcapsules are made, they are formulated into a composition that can form a layer on a colored or imaged substrate. The composition may be referred to as an "ink" composition as explained above. This ink composition may be applied to a substrate by any known or hereinafter developed printing process or as a coating applied by a brush, roller, slot dye, flexography, gravure, silk screen, or inkjet.

The ink composition includes about 25% to about 55% by weight of the microcapsules described above, 1% to about 8% by weight of a binder, about 0.1% to about 3% by weight of a rheology modifier, and, optionally, about 0.1% to about 0.2% by weight of a preservative and about 0.01% to about 0.5% by weight of a foam control agent.

TABLE 1

|  | wt % | more preferably wt % |
|---|---|---|
| CORE MATERIAL | | |
| Hexadecane (m. pt. 18° C.) | 25-40 | 27-35 |
| Hyperbranched hydrocarbon polymer | 0.1-8 | 0.1-1.5 |
| WALL MATERIAL | | |
| 300 bloom gelatin | 0.1-5 | 0.1-0.8 |
| carboxy methylcellulose | 0.1-0.8 | 0.1-0.5 |
| 50% aqueous glutaraldehyde (crosslinker) | 0.1-1.5 | 0.4-1.2 |
| INK BASE | | |
| Polyvinyl alcohol 12% Aq. Solution | 1-5 | 2-3 |
| carboxy methylcellulose | 0.1-3 | 0.1-0.8 |
| Preservative | 0.1-0.2 | 0.1-0.2 |
| Foam Control Agent | 0.01-0.5 | 0.05-0.1 |
| water | balance | balance |

EXAMPLE 1

| | Wt (grams) | Wt % of Ink Base |
|---|---|---|
| CORE MATERIAL | | |
| Hexadecane (m. pt. 18° C.) | 32.5 | 19.03 |
| Pentadecane (m. pt. 10° C.) | 17.5 | 10.25 |
| Stearic acid | 0.5 | 0.29 |
| WALL MATERIAL | | |
| 300 Bloom Gelatin | 5.0 | 2.93 |
| DI water | 244.45 | Balance (66.01) |
| Carboxy methylcellulose | 0.55 | 0.32 |
| 50% aqueous glutaraldehyde (crosslinker) | 1.25 | 0.73 |
| INK BASE | | |
| Microcapsule Slurry (from above components) | 170.0 | |
| Xanthan Gum | 0.45 | 0.26 |
| Preservative | 0.3 | 0.18 |

5.0 grams of 300 bloom gelatin, 0.55 grams of carboxymethylcellulose (CMC) and 244.45 grams of deionized water were stirred into solution at 60° C. The solution was added to a heated Waring Blender blender cup capable of approximately 450 mL capacity. The core phase included 17.5 grams of Pentadecane, 32.5 grams of Hexadecane and 0.5 gram of Stearic acid, and was added to the mixing aqueous solution. The core particles were blended to a droplet size of less than 20 μM. The emulsion was transferred to a beaker with an agitator. While stirring, 0.5% hydrochloric acid was added dropwise to achieve a final pH in the range of 5.0 to 5.5. This pH controlled mixture was cooled slowly to 25° C. As stirring continued, the system was chilled in an ice bath to less than 5° C. Thereafter, 1.25 grams of 50% aqueous glutaraldehyde were added dropwise and the entire stirring system was allowed to slowly warm to room temperature over a 12-16 hour period. The entire stirring system was then warmed to above 35° C. for approximately 30 minutes, then poured through a 200 mesh sieve. The microcapsules were washed with deionized water and decanted. The concentrated microcapsule slurry was brought to a final weight of 170 grams by the addition of deionized water.

0.30 grams of the preservative Acticide GA and 0.45 grams of the rheology modifier Xanthan gum were added to the slurry solution, and a final viscosity of 760 centipoise was observed. Mean particle size was 29.3 μm. A 0.020" wet drawdown was made of the ink base onto a printed polyester film and allowed to air dry. The drawdown was viewed and the thermal response occurred between 12° C.-13° C.

EXAMPLE 2

| | Wt (grams) | Wt % of Ink Base |
|---|---|---|
| CORE MATERIAL | | |
| Hexadecane (m. pt. 18° C.) | 50.0 | 25.79 |
| Hyperbranched hydrocarbon polymer | 1.5 | 0.77 |
| WALL MATERIAL | | |
| 300 bloom gelatin | 5.0 | 2.57 |
| DI water | 244.45 | Balance (57.65) |
| Carboxy methylcellulose | 0.55 | 0.28 |
| 50% aqueous glutaraldehyde (crosslinker) | 1.25 | 0.64 |
| INK BASE | | |
| Microcapsule Slurry | 170.0 | |
| Polyvinyl alcohol 12% Aq. Solution | 22.6 | 11.65 |
| Carboxy methylcellulose | 0.51 | 0.26 |
| Preservative (KathonCG/ICP) | 0.34 | 0.18 |
| Foam Control Agent | 0.40 | 0.21 |

Another encapsulated mixture utilized the core material of 50 grams of Hexadecane and 1.5 gram of hyperbranched hydrocarbon polymer. The core material was processed in the generally described capsular manner as in Example 1.

The ink solution is prepared by combining the 170 grams of microcapsule slurry, 22.6 grams of 12% PVOH, 0.51 grams of rheology modifier CMC, 0.34 grams of preservative Kathon, and foam control 0.4 grams. The ink base viscosity was observed to be 620 centipoise @ 21° C. Mean particle size was 13.4 μm. The ink was coated onto black printed label stock with a 110 mesh silk screen. The coatings were allowed to air dry and a thermal response was observed to occur between 17° C.-18° C.

What is claimed is:

1. A printable ink for reversible thermal indicators comprising:
   microcapsules retaining therein a core material that is opaque as a solid and transparent as a liquid; and
   a binder and a rheology modifier as a carrier for the microcapsules;
   wherein the microcapsules retain the core material therein for repeated, reversible transitions from solid to liquid and liquid to solid;
   wherein the binder and the rheology modifier are the same substance or are different substances;
   wherein the core material comprises:
      a phase change material mixed with a nucleation aid;
         wherein the nucleation aid reduces supercooling, thereby the core material becomes solid reset at a known temperature, and is selected from one or more of hyperbranched hydrocarbon polymers, fatty acids, microcrystalline waxes, isoparaffins, polyethylene waxes, and combinations thereof.

2. The printable ink of claim 1, wherein the core material is selected from the group consisting of one or more straight chain hydrocarbons having 12-44 carbons, fatty acid esters, and fatty alcohols and combinations thereof.

3. The printable ink of claim 1, wherein the core material comprises about 25% to about 48% by weight of the printable ink.

4. The printable ink of claim 3, wherein the core material comprises about 27% to about 37% by weight of the printable ink.

5. The printable ink of claim 1, wherein the core material has a phase change from solid to liquid or liquid to solid within one degree Celsius.

6. The printable ink of claim 1, wherein the wall material is selected from the group consisting of gelatin, albumin, methyl cellulose, carboxy methylcellulose, and combinations thereof.

7. The printable ink of claim 1, wherein the binder and the rheology modifier are the same substance and comprise one or more of an aqueous polyvinyl alcohol solution and a carboxy methyl cellulose.

8. The printable ink of claim 1, further comprising one or more of a biocide and a foam control agent.

9. A reversible temperature indicator comprising:
a substrate having a colored surface with at least a portion of the colored surface covered with the printable ink of claim 1;
wherein at least the portion of the colored surface covered by the printable ink is hidden by the printable ink and revealed when the substrate reaches a temperature above a transition temperature of the core material, which renders the core material transparent.

10. The reversible temperature indicator of claim 9, further comprising an adhesive layer applied to a surface of the substrate opposite the colored surface thereof, and optionally a release layer adhered to the adhesive layer.

11. The reversible temperature indicator of claim 10, wherein the adhesive layer is a pressure sensitive adhesive layer.

12. The reversible temperature indicator of claim 9, further comprising a primer coating between the colored surface of the substrate and the printable ink.

13. The reversible temperature indicator of claim 12, wherein the primer coating comprises a polymer solution or an emulsion of acrylic, styrene acrylic, polyurethane, ethylene-acrylic acid, or combinations thereof.

14. The reversible temperature indicator of claim 9, further comprising a protective coating covering the printable ink applied to the substrate.

15. The reversible temperature indicator of claim 14, wherein the protective coating comprises a protective lamination tape.

16. The reversible temperature indicator of claim 9, wherein the colored surface of the substrate includes an image or word hidden by the printable ink and revealed when the substrate reaches a temperature above the transition temperature of the core material.

17. The reversible temperature indicator of claim 9, wherein the core material is selected from the group consisting of one or more straight chain hydrocarbons having 12-44 carbons ester waxes, and combinations thereof.

18. The reversible temperature indicator of claim 17, wherein the core material comprises about 25% to about 48% by weight of the printable ink.

19. A printable ink for reversible thermal indicators comprising:
microcapsules retaining therein a core material that is opaque as a solid and transparent as a liquid; and
a binder and a rheology modifier as a carrier for the microcapsules;
wherein the microcapsules retain the core material therein for repeated, reversible transitions from solid to liquid and liquid to solid, and the core material has a phase change from solid to liquid or liquid to solid within one degree Celsius;
wherein the binder and the rheology modifier are the same substance or are different substances.

* * * * *